Sept. 5, 1972  W. P. ROWLAND  3,689,346
METHOD FOR PRODUCING RETROREFLECTIVE MATERIAL
Filed Sept. 29, 1970  2 Sheets-Sheet 1

Inventor
William P. Rowland
By Peter L. Costas
Attorney

United States Patent Office 3,689,346
Patented Sept. 5, 1972

3,689,346
METHOD FOR PRODUCING RETROREFLECTIVE MATERIAL
William P. Rowland, Southington, Conn., assignor to Rowland Development Corporation, Kensington, Conn.
Filed Sept. 29, 1970, Ser. No. 76,561
Int. Cl. B29b 3/00
U.S. Cl. 156—245                                      14 Claims

ABSTRACT OF THE DISCLOSURE

Retroreflective sheeting is produced on a continuous basis by applying transparent sheet material over a hardenable molding material previously deposited upon a moving mold surface, after which the molding material is solidified and bonded to the sheet material to produce a composite structure. The mold surface has an array of minute, contiguous cube-corner recesses therein, so that the sheeting correspondingly has a multiplicity of closely spaced cube-corner formations spaced about and projecting from a smooth surface of the sheet material, which provides the body portion thereof.

The apparatus most conveniently used is a drum mounted for rotation and having a mold surface providing an array of cube-corner recesses disposed about its circumference. A suitable member desirably cooperates with the mold surface for application of the sheet material and uniform distribution of the molding material thereover.

BACKGROUND OF THE INVENTION

Various reflective materials are commonly employed for safety and decorative purposes. One of the most common principles employed simply involves the application of a reflective coating upon a surface of the item or the use of a highly reflective material such as polished metal. In addition to reflective coatings and specular surfaces, it is also common to use structures which have upon one or both surfaces various formations which reflect the light rays impinging thereon, either principally as a result of the steepness of the angle at which the light ray impinges thereon, or by virtue of reflective coatings on the surface of the formations.

There has been a constant demand for retroreflective materials i.e., materials capable of reflecting the predominant portion of light rays impinging thereon in a substantially parallel path toward the source of the light. Minnesota Mining and Manufacturing Company has sold a material under the trademark Scotchlite which relies upon minute glass spheres embedded in a matrix of synthetic resin to provide such retroreflection. Another type of retroreflective element has employed molded members of cube-corner configuration on one surface thereof, such members being of glass or synthetic plastic. Indicative of the efforts to use cube-corner formations for retroreflective structures are Straubel United States Pat. No. 835,648 granted Nov. 13, 1906; Hedgewick et al. United States Pat. No. 3,258,840 granted July 5, 1966; and Jungersen United States Pat. No. 2,210,790 granted Feb. 9, 1943 and No. 2,444,533 granted July 6, 1948.

Cube-corner reflectors molded from glass and more recently from acrylic resins have commonly been employed as safety devices on bicycles, automobiles and other vehicles. Although it has been suggested that the cube-corner might be of small dimension, generally such formations have been appreciable in size and the nature of the material from which the reflector has been fabricated generally resulted in structures which are relatively rigid in character and which do not lend themselves either to shaping to various substrates of nonplanar character or to use as a fabric which might be worn. Moreover, as the size of the cube-corner formations is reduced, criticality in control of angles and dimensions becomes far more acute since even a minute deviation will produce a substantial deviation in the capability of material to retroflect light rays impinging thereon.

Novel composite retroflective materials having minute, closely spaced cube-corner formations, which return the great preponderance of light rays entering the front surface thereof, have recently been developed. These materials may be relatively flexible so as to permit shaping to conform to support surfaces of various configurations and to permit utilization as a fabric for application to, or formation into, wearing apparel, and they may be provided with an adhesive coating for convenient adherence to a support surface. It has also recently been proposed to provide a novel method for manufacturing such retroreflective material from synthetic resins in a manner that permits selection of resins to produce optimum characteristics; the method proposed is relatively simple and economical, and affords a high degree of control to ensure optimum development of the cube-corner formations. These recent developments are the subject of an application for United States Letters Patent that has been filed concurrently herewith, and in the names of the same inventor and assignee Ser. No. 76,551, filed Sept. 29, 1970. Notwithstanding these developments, a desire remains for a process by which high quality retroreflective sheeting can be produced on a continuous basis, and for apparatus especially adopted for use therein.

Accordingly, it is an object of the present invention to provide a novel method of continuously producing retroreflective sheeting of substantially uniform dimension wherein a multiplicity of minute cube-corner formations provide a high level of retroreflectivity.

It is also an object to provide such a method by which the cube-corner formations are substantially perfectly formed and by which undesired light refraction in the sheeting is minimized.

Another object is to provide such a method by which flexible reflective sheeting having the foregoing characteristics may be produced relatively inexpensively and with a high degree of facility and speed.

A further object is to provide such apparatus wherein a molding surface having an array of minute cube-corner indentations therein is fabricated relatively inexpensively and in such a manner as to produce a high quality and uniform product in which imperfections are minimized.

SUMMARY OF THE INVENTION

It has now been found that the foregoing and related objects can be readily attained in a method for making retroreflective composite sheeting on a continuous basis wherein a hardenable molding material is deposited upon a moving mold surface having an array of minute, continuous cube-corner recesses therein. Each of the recesses have a maximum side edge dimension of less than about 0.025 inch and preferably less than about 0.01 inch, and the molding material is essentially transparent and sufficient in amount and fluidity to essentially completely fill the recesses under the conditions of operation. A relatively flexible sheet material of essentially transparent synthetic resin is applied to the molding material on the mold surface under sufficient pressure to effect intimate surface contact therebetween and the molding material is subjected to conditions sufficient to effect substantial solidification thereof and bonding to the adjacent surface of the sheet material to form a composite structure therewith. The composite structure is thereafter removed from the mold surface to provide retroreflective sheeting comprising a body portion provided by the preformed sheet material and having a substantially smooth front surface, and a multiplicity of minute cube-corner formations corresponding to the recesses. The cube-corner formations are closely spaced about and project from the opposite surface of the body portion, with the close spacing thereof substantially avoiding any smooth areas therebetween. Light rays entering the sheeting through the front surface of the body portion predominately pass through and into the cube-corner formations, by which they are reflected back through the body portion along a path substantially parallel to the path of entry.

The method may include the additional step of uniformly distributing the hardenable molding material over the molding surface, effected simultaneously with the sheet material-applying step by introducing the molding material and sheet material in the appropriate superposed relationship into a nip of substantially fixed spacing formed between the molding surface and an adjacent member cooperating therewith. The molding material employed may be a molten synthetic resin, in which case the solidification thereof is accomplished at least in part by cooling with the inherent nature of the molten resin producing bonding thereof to the sheet material. Alternatively, the molding material may be a resin having cross-linkable groups, in which case solidification is accomplished at least in part by cross-linking of the resin. As an additional possibility, the molding material may be a partially polymerized resin formulation with solidification thereof being accomplished at least in part by effecting further polymerization in the formulation.

Exemplary molding materials may be selected from the group consisting of vinyl halide resins, acrylic-modified vinyl halide resins, vinyl chloride vinyl acetate copolymers, (alk) acrylic ester resins, ethylenically unsaturated nitrile resins, monovinylidene aromatic hydrocarbon resins, olefin resins, cellulose ester resins, polysulfone resins, polyphenylene oxide resins and polycarbonates. Synthetic resins which may be used as the sheet material desirably may be polyvinyl halides (particularly polyvinyl chloride and polyvinyl fluoride) polyethylene terephthalate, polyvinylidene chloride polycarbonates, polysulfones and cellulose ester polymers.

Preferably, the method additionally includes the step of applying a wetting agent to the mold surface before depositing the molding material thereon, to thereby improve flow of molding material into the recesses thereof the surface. It may also include the step of depositing a reflective coating on the faces of the cube-corner formations after removal of the composite structure from the mold surface, and an adhesive layer may be deposited on the reflective coating with a backing material removably adhered to the adhesive layer, so that the backing material is removable to permit adherence of the retroreflective sheeting to a substrate.

The apparatus used for production of retroreflective sheeting on a continuous basis comprises a frame having supported thereon, for movement in a continuous path, a support member having a substantially continuous mold surface. The mold surface has an array of minute, contiguous cube-corner recesses therein, and each of the recesses has a maximum side edge dimension of less than about 0.025 inch. Preferably the maximum side edge dimension of the recesses is less than about 0.01 inch. A material dispensing station is located along the continuous path for depositing hardenable molding material upon the mold surface during travel of the surface thereby. A sheet material applying station is also located along the path downstream of the material dispensing station, and the sheet material applying station includes pressure means positioned closely adjacent the molding surface for urging sheet material thereagainst and for distributing the hardenable molding material uniformly over the mold surface. Treating means along the path downstream of the sheet material applying station is adapted to effect hardening of the molding material and bonding of it to the sheet material. A stripping station further downstream along the path effects removal from the mold surface of the composite structure so produced, and drive means is provided for moving the mold surface substantially continuously along the continuous path.

Preferably, in the apparatus the support member is a rotatably mounted drum that has the mold surface provided upon its circumference. The pressure means of the sheet material applying station may be a roller having its axis of rotation parallel to that of the drum and having its circumferential surface in a substantially fixed position adjacent to the mold surface; a nip of substantially constant spacing is thereby cooperatively provided therebetween. Such an arrangement will tend to minimize any discrepancies in thickness and to minimize the thickness of any web portion formed of the molding material utilized in the production of the cube-corner formations. It is accomplished by the application of pressure at the time that the body member is placed upon the mold surface so that the resin is distributed evenly at the interface; excess resin may be expressed or extruded outwardly of the interface to some extent, or it may desirably form a pool or reservoir thereof. Therefore, it is especially desirable to employ a member or element that cooperatively forms a nip with the mold surface at the location at which the sheet material is applied, since adequate pressure for intimate contact with the molding material and uniform distribution thereof over the mold surface and into the recesses thereof may simultaneously be achieved thereby. The mold surface may be provided by a multiplicity of relatively thin plates secured to the support member with the exposed outer surfaces of the plates being metallic and having said cube-corner identations defined thereon.

The material treating means most desirably comprises a device for radiating energy. In one instance, such a device comprises heating means to heat the molding material to a temperature above ambient, in which case the treating means also includes means to thereafter cool the material. Alternatively, the radiating device may comprise a source either of high energy radiation or a high energy charged particles. Finally, the apparatus may additionally include, along the path and upstream of the material-dispensing station, a preapplication station for applying a wetting agent to the mold surface. Such an agent serves to enhance flow of the molding material into the recesses of the mold surface, and thereby to insure essential complete fillage thereof.

DETAILED DESCRIPTION OF THE ILLUSTRATED EMBODIMENTS

Figure 8:
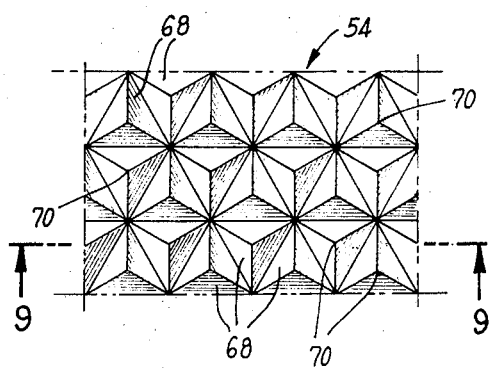
FIG. 8 is a fragmentary view of the rear surface of reflective sheeting produced in accordance with the present method.
Figure 9:
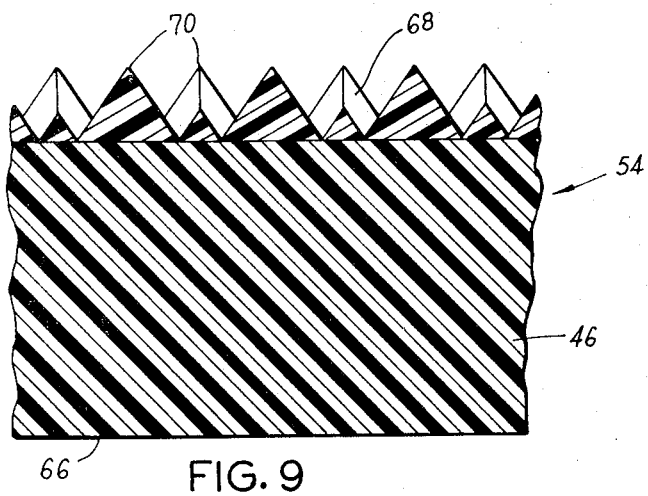
FIG. 9 is a fragmentary sectional view of the sheeting to an enlarged scale along the line 9—9 of FIG. 8.

Turning now in detail to FIGS 1–7 of the appended drawings therein illustrated is apparatus for producing on a continuous basis the reflective sheeting of the type illustrated in FIGS. 8 and 9. The apparatus includes a molding drum 10 mounted upon an axle or shaft 12 for rotation in the direction indicated by the arrow (i.e., counterclockwise). The circumferential portion of the drum 10, generally designated by the numeral 14, consists of a multiplicity of metallic plates 16 bonded to the circumferential base portion 18 by a layer 20 of an appropriate adhesive. Each of the plates 16 is formed with a multiplicity of identical, contiguously arranged cube-corner recesses or indentations 22, and the plates 16 are provided entirely about the circumference of the drum 10 to provide a molding surface that has a substantially continuous array of cube-corner recesses 22 therein.

A head assembly, generally designated by the numeral 24, is mounted above the drum 10 at one point about its circumstance for reciprocal movement thereacross on the pair of horizontal rods 25. The assembly 24 consists of a coating head 26 and a spray head 28, the purpose of which will be explained hereinafter. The heads 26, 28 are supported upon a suitable base 30, to which feed lines 32 are attached for delivery of the desired materials, and each of the heads 26, 28 is provided with a nozzle 34 that is suitably configured for its intended function. A trough or tank 36 containing a liquid cooling medium 38 (e.g., water) is supported (by means not shown) below the drum 10 in a position for passage of the circumferential portion 14 thereof through the medium 38 as the drum 10 rotates, and a bank of heat (or other energy) radiating elements 40 is mounted (also by means not shown) adjacent the drum 10 for treatment of the materials deposited thereon at a point about the axis between the coating head 26 and the tank 36.

Rotatably mounted film feed and take-up reels 42 and 44 respectively, are positioned on opposite sides of the assembly 24. In passing from the feed reel 42 to the drum 10, the film 46 passes first between a set of three tension rollers 48 and thereafter about a relatively resilient pressure roll 50, the latter being mounted with its surface closely adjacent that of the drum 10 and with their respective axes of rotation parallel. A stripping roll 52 is similarly mounted on the opposite side of the drum 10, and the formed reflective sheeting generally designated by the numeral 54, passes about it and, in its travel to the take-up reel 44, about a set of four idler rolls 56, 56'. The idler rolls 56, 56' define a generally rectangular path within which a reflection measuring device 58 is mounted for horizontal reciprocal movement upon the rod 59. The reflection measuring device 58 includes a light source to project a beam 60 normal to the front surface of the sheeting 54 as the latter passes between the two internal idler rolls 56'. The motor 61 drives the drum 10 in a conventional manner, such as through the drive belt 63 provided about the shaft 12 and shaft 65 thereof.

Operation of the apparatus will be apparent from the foregoing and the following description. As the drum 10 continuously rotates, a suitable wetting agent or plasticizer 62 is sprayed directly upon its surface from the spray head 28, and a hardenable molding material 64 in fluid form is deposited thereupon from the coating head 26. Film 46 is continuously withdrawn from the feed reel 42 and applied against the drum 10 by the pressure roll 50, which cooperates with the drum 10 to provide a nip at which the hardenable material 64 is uniformly distributed over the surface of the drum 10, and at which intimate contact is effected between the material 64 and the film 42.

The freshly applied material 64 and film 42 travel together past the bank of radiating elements 40 (which, for purposes of description, are assumed to be heat lamps), whereat hardening of the material 64 and bonding thereof to the film 42 are concurrently effected. Thereafter, the cooling medium 38 in the trough 36 permanently sets the material 64 which now is bonded to the film 46 so that the completed reflective sheeting 54 can readily be stripped from the drum 10 about the roll 52 and finally wound upon the take-up reel 44.

As will be appreciated, the measuring device 58 scans the sheeting 54 to insure that each portion thereof exhibits at least the minimum acceptable level of retroreflection, by indicating in an appropriate manner when the criterion specified has not been met.

Turning now to FIGS. 8 and 9, FIG. 8 depicts the rear surface of a portion of the sheeting 54, produced as hereinbefore described. The surface consists of an array of identical, contiguous cube corners 68, the apices 70 of which are regularly aligned in columns and rows, and project upwardly from the plane of the drawing. The illustrated surface is designated as the rear of the sheeting 66 because, in use, light enters and exits from the opposite surface thereof. Parenthetically, it should be noted that FIG. 8 could also be considered to illustrate the molding surface of the drum 10, in which case the apices 70 could project downwardly into the page to define the recesses 22 therein present. FIG. 9 illustrates the construction of the reflective sheeting 54 in greatest detail, and shows that the smooth or generally planar front surface 66 of the sheet material 46 is maintained in the completed composite structure. Although the apices of the troughs between the cube corners 68 ideally coincide with the surface 66 of the film 46 adjacent thereto, in practice a thin web of molding material may underlie the cube-corner array, and will not normally interfere with the optical or other properties of the sheeting to an appreciable extent.

Figure 1:
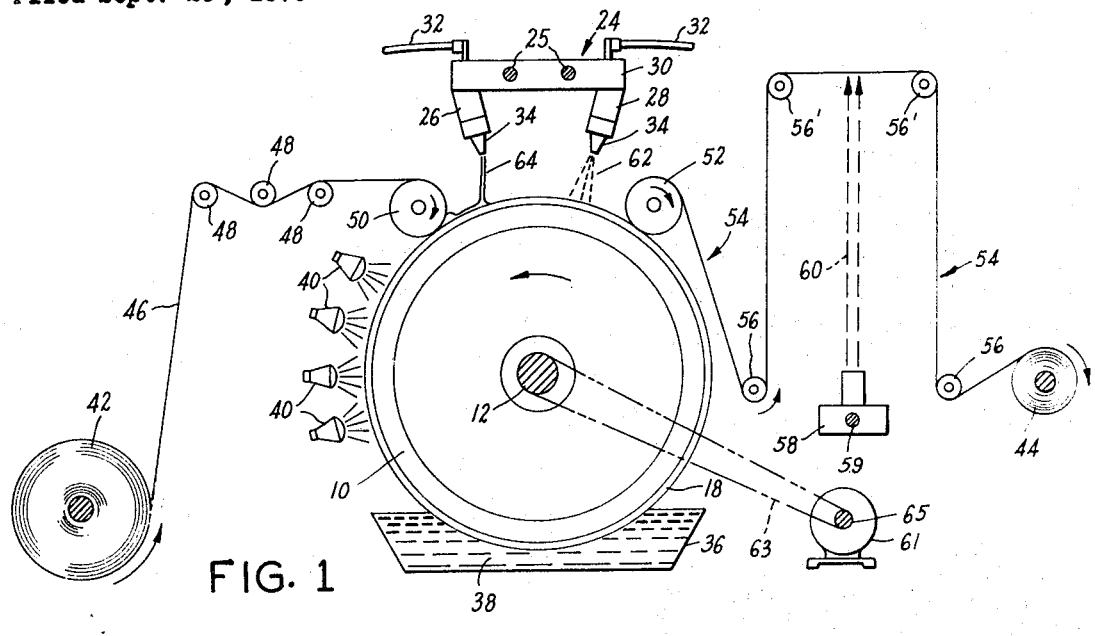
FIG. 1 is a schematic elevational view of apparatus embodying the present invention.
Figure 2:
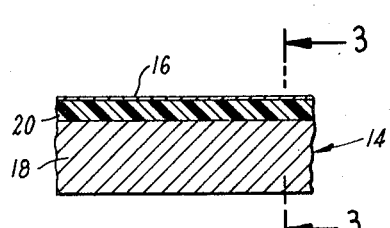
FIG. 2 is a fragmentary sectional view to an enlarged scale of a portion at the surface of the molding drum of FIG. 1.
Figure 3:
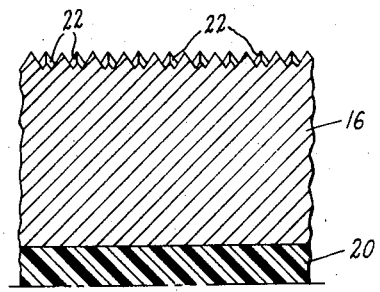
FIG. 3 is a fragmentary sectional view along the line 3—3 of FIG. 2 to a greatly enlarged scale from illustration of the cube-corner recesses provided therein.
Figure 4:
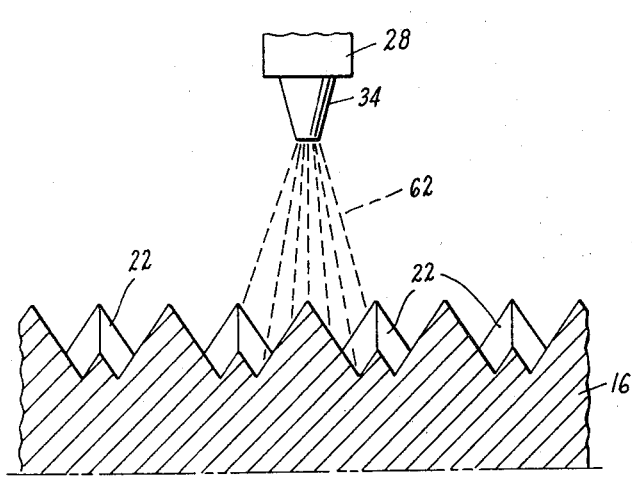
FIG. 4 is a fragmentary sectional view similar to FIG. 3 but drawn to an even more greatly enlarged scale to illustrate more clearly the cube-corner indentations and further showing the spray head mounted thereabove.
Figure 4A:
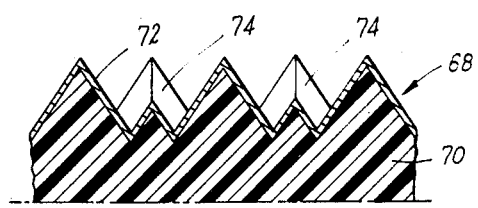
FIG. 4A is a view similar to FIG. 4 of an alternate embodiment of molding surface but omits the spray head and shows the surface portion constructed as a metal/resin composite.
Figure 5:
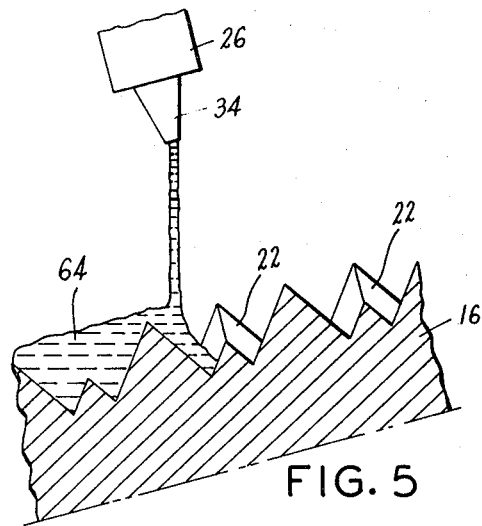
FIG. 5 is a fragmentary sectional view similar to FIG. 4, taken at a second location about the drum axis spaced circumferentially from that of FIG. 4 and illustrating the deposition of a liquid molding material thereonto from a coating head mounted thereabove.
Figure 7:
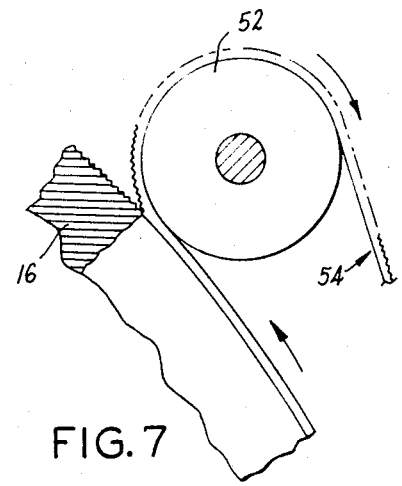
FIG. 7 is a fragmentary view similar to FIG. 6 of the apparatus at the sheet stripping location.

In FIG. 4A a construction providing an alternative to the plates 16 is illustrated, wherein the plate, generally designated by the numeral 68, is composed of a resinous base 70 and a thin metallic layer 72 on the upper surface thereof provides the recesses. A tough, deformable and dimensionally stable resin, such as the silicone polymers, may be used for the base 70, to permit the recesses 74 to be molded therein and to render the plate 68 readily conformable to a curved surface. A vacuum or electroless-deposited layer of gold or the like may furnish the metallic layer 72 to protect the surface, primarily against corrosive attack from plasticizer or other materials sprayed or deposited thereon.

As has been previously indicated, a key aspect of the present invention resides in the provision of a method and apparatus for the production of sheeting having minute cube-corner formations which are closely spaced so as to avoid substantially any smooth or flat areas therebetween. Although the cube-corner formations may have a side edge dimension of up to 0.025 inch, the preferred structures utilize a side edge dimension of not more than 0.010 inch and most desirably on the order of 0.004–0.008 inch.

The thickness of the sheet material in the composite structure may vary somewhat depending upon the particular application. However, it will generally have a thickness of about 0.002–0.030 inch, and preferably it will be about 0.003–0.010 inch thick.

By constructing the composite structure from a separate body portion to which are adhered the separately formed cube-corner formations, it is possible to achieve the maximum control over the cube-corner formations and also to select different resins for the two components, which is often desirable to achieve an optimum balance of properties. Although it is theoretically possible to emboss the cube-corner formations into the surface of preformed synthetic plastic material, efforts to utilize such a technique in the production of minute cube-corner formations, as are used in the present invention, have proven unsatisfactory. Any aberration in flow of the material into the recesses of the embossing member will greatly affect the retroreflectivity of the resultant product. Moreover, variations in thickness of the sheet material which is embossed tend to affect the precision with which the cube-corner formations may be developed. Efforts to mold the cube-corner formations and the body portion of the product simultaneously have also proven generally unsatisfactory because of the difficulty in obtaining adequate flow of the resin into the recesses of the mold. Moreover, such a procedure requires that the same resin be employed for all portions of the composite structure.

Thus, the process of the present invention has proven particularly advantageous in affording optimum control over the development of the cube-corner formations and in permitting a selection of distinct resins for the body portion and for the cube-corner formations. In this process, a substantially continuous mold surface is produced having precisely formed cube-corner recesses which are so closely spaced as to avoid substantially any smooth areas therebetween. Although the mold may be formed from a synthetic resin, the preferred mold has a metallic surface to ensure very smooth, precise surface on the cube-corner faces and to minimize the likelihood of deterioration during extensive use, as well as of possible adhesion between the molding material and the surface of the mold. Accordingly, the mold may be fabricated directly from a suitable metal by engraving, hobbing or otherwise forming the cube-corner recesses therein. Alternatively, a suitably engraved or otherwise formed metallic member may be used as a master mold for forming the desired mold element by the deposition of metal thereon to form a layer of sufficient thickness which is then stripped therefrom. These stripped impressions which may be made by conventional electroforming procedures are then used as the mold elements after mounting upon a suitable support surface to avoid injury thereto and the mold surface may then be developed on a suitable support member from a multiplicity of such elements. In order to minimize corrosion of the metallic surfaces of the mold, it has been found desirable to provide a highly inert metallic coating thereon such as may be obtained by depositing gold or a gold alloy thereon.

As illustrated, the support for the mold surface is most desirably provided by a rotatably mounted drum, since such a drum facilitates continuous application of materials and stripping of the composite product, and also provides firm support for the mold elements thereon. Other types of support members are also feasible, such as a continuous flexible belt, or even a revolving disk; however, certain disadvantages such as the non-linear configuration of the product may render the latter alternative less attractive. The means of securing the mold surface to the support may vary considerably depending upon the degrees of permanency and rigidity and the heat transfer characteristics desired; for example, they may be bonded with appropriate adhesives, or they may be affixed with suitable screws, rivets, pins or the like.

The design of the means for dispensing materials upon the moving surface and for stripping the composite therefrom may also vary to a considerable degree from those of the illustrated embodiment, depending primarily upon the type of support member employed, and different devices appropriate for substitution will be apparent to those skilled in the art. In the method, efforts are made to minimize any discrepancies in thickness and to minimize the thickness of any web portion formed of the molding material utilized in the production of the cube-corner formations. This is conveniently accomplished by the application of pressure at the time that the body member is placed upon the mold surface so that excess resin is distributed evenly at the interface and to some extent expressed or extruded outwardly of the interface. Moreover, the application of pressure facilitates the flow of the fluid molding material into the recesses of the mold surface. Accordingly, it is especially desirable to employ a member or element that cooperatively forms a nip with the mold surface at the location at which the sheet material is applied since adequate pressure for intimate contact with the molding material and uniform distribution thereof over the mold surface and into the recesses thereof may simultaneously be achieved thereby. As has been mentioned, it is of primary importance that flow of the molding material into the recesses be adequate to essentially completely fill them; the nip arrangement described is a very satisfactory means of facilitating such flow on a continuous basis, as is necessary in the practice of the present method.

Flow of the molding material into the recesses is also facilitated by the prior application of a solvent, plasticizer, wetting agent or other flow promoting agent (herein collectively referred to "wetting agent"). This enhances the fluidity of the molding material about the surfaces of the recesses and greatly promotes optimum fillage thereof.

The technique utilized for achieving solidification of the molding material will vary with the particular molding material selected. When a molten synthetic resin is employed as the fluid molding material, solidification may be accomplished merely by cooling thereof; this may be accomplished through chilling of the mold, by directing cool air against the surface of the body member or by allowing the heat energy to radiate therefrom. When the molding material is a B-stage or partially polymerized resin, solidification may be accomplished by the application of heat for a period of time sufficient to achieve the desired degree of polymerization. When the molding material is a cross linkable formulation, solidification may be accomplished by promoting cross linking of the component materials through any convenient means depending upon the nature of cross linkable material. As is well known in the art, cross linking may be effected by use of free radical initiators, heat, high energy radiation and the like, and the radiating elements depicted in the drawings may therefore comprise any suitable source of energy. Thus, they may be a simple infra-red or other heat source, a source of alpha or beta particles, gamma or X-ray radiation, photons, etc. Moreover, it will be appreciated that the molding material may be essentially monomeric in character and that the solidification thereof may be accomplished by polymerization in situ within the cube-corner recesses of the mold surface; such polymerization may be promoted by heat, free radical initiators, or high energy radiation, and the actinic source may be internal of the support member if so desired. In still another technique, a plastisol formulation may be employed in which the resin is fluxed by the plasticizer upon the application of heat. Obviously, combinations of these techniques also may be used to obtain the desired solidification.

Various synthetic resins may be employed for the cube-corner formulations and for the sheet material including polymers of (alk) acrylic acid esters such as polymethyl methacrylate and polybutyl acrylate; cellulose esters such as cellulose acetate polymer, cellulose acetate/butyrate copolymer, and cellulose propionate polymer; vinyl halides such as polyvinyl fluoride; vinylidene halides such as polyvinylidene chloride; monovinylidene aromatic hydrocarbon polymers such as polystyrene and styrene/acrylonitrile copolymers; ethylenically unsaturated nitriles such as polyacrylonitrile; polycarbonates; polyesters such as polyethylene terephthalate; polyphenylene oxide; polysulfones; and polyolefins such as polyethylene and polypropylene. Interpolymers of various of the several above-mentioned types of monomers, e.g., vinyl chloride/vinyl acetate copolymers, may also be employed, as may be mixtures of polymers. The particular resin formulations selected for the components of the composite structure will vary depending upon the application, the thickness desired for the body member, the desire for flexibility, and the need for achieving interadhesion therebetween. For outdoor applications, materials which are moisture resistant, ultraviolet resistant and abrasion resistant are particularly advantageously employed at least for the body portion since that portion is generally exposed to the atmosphere and requires good weathering characteristics. Moreover, it will be appreciated that the sheet material may itself be a laminate of films or sheets of two different synthetic resins, and it may be provided with coatings of appropriate materials.

The resins preferably employed for the body portion include polyvinyl halide, polyethylene terephthalate, polyvinylidene chloride, polycarbonates, polysulfones and cellulose ester polymers. The resins preferably employed for the cube-corner formations comprise (alk) acrylic acid ester resins, acrylic-modified vinyl chloride resins, vinyl chloride/vinyl acetate copolymers, ethylenically unsaturated nitrile resins, monovinylidene aromatic hydrocarbon resins, olefin resins, cellulose ester resins, polysulfone resins, polyphenylene oxide resins and polycarbonates. Exemplary combinations for the body portion/cube-corner formations include polyvinyl chloride/acrylic modified polyvinyl chloride; polyvinyl fluoride/polyvinyl chloride; polycarbonate/polycarbonate; polyvinyl chloride/polymethyl methacrylate; polysulfone/polymethyl methacrylate; polysulfone/polyvinyl chloride; and polyethylene terephthalate/polymethyl methacrylate.

In selecting the molding materials employed for the present invention, it should be remembered that long lasting properties will require resins which do not have readily volatilizable plasticizers or other components, and which have an acceptable level of light stability. Thus, stabilized formulations are desirably employed when the resin itself is susceptible to light or oxygen degradation. By proper selection of the resin systems, the sheet material may also provide a valuable degree of protection for the resin of the cube-corner formations, which may exhibit relatively poor stability when the cube-corner formations are reflectively coated and further coated with a lacquer and/or adhesive. These coatings also may act as protective layers since the body portions will, in many applications, serve as a barrier layer for ultraviolet radiation, vapor, gasses, etc. Moreover, the sheet material is desirably fabricated of a resin which affords a high degree of abrasion resistance since aberrations in the front surface of the composite structure will greatly reduce its retroreflectivity.

It should be appreciated that the selection of different resins for the two component portions of the product must recognize the need for compatability of the two resins. For example, one resin must not contain a substance which is deleterious to the other and which will migrate thereinto across the interface. Moreover, when plasticized materials are employed it is desirable to use plasticizers which do not readily migrate, and/or to select formulations for both component resins in which the plasticizer contents are balanced so as to avoid a degree of migration therebetween which might materially affect the properties of the component portions.

It will be readily appreciated that the cube-corner formations must have smooth faces and that the intersecting faces thereof should provide essentially perfect cube-corners. Any deviation from a perfect cube-corner or surface irregularity will materially reduce the retroreflectivity of the formation, and is desirable only under certain controlled circumstances.

Normally, the air interface at the cube-corner formations will be relied upon for retroreflection of the light rays. Obviously, the angle at which the light rays strike the faces of the cube-corners will determine whether each ray is retroreflected or passes outwardly through the rear surface. If the angle of incidence is less than the critical angle for the resin employed, the light ray will not be retroreflected. However, the predominant portion of light rays entering the front surface of the sheet material will be retroreflected by the cube-corner formations.

The reflectivity of the cube-corner formations can be enhanced by depositing a reflective coating thereon. Such a coating may be conveniently provided by a metallizing technique such as that wherein a very thin film of aluminum or other metal is deposited on the surface by vaporization thereof at a very low subatmospheric pressure; chemical deposition techniques may also be used. Reflective coatings may also be provided by use of a lacquer containing metallic particles of pigments affording high degrees of reflectivity; for example, pearl lacquers may be employed. In still another technique, the reflective coating may be provided by a metallized synthetic plastic film applied in intimate contact over the surface of the cube-corner formations.

As has been previously indicated, the adhesive coating upon the composite structure offers the advantage of permitting the retroreflective material to be mounted on various support structures where reflectivity is desired. Although various types of bonding agents may be employed, ever-tacky adhesives of the type conveniently used in the manufacture of pressure sensitive tapes have proven particularly advantageous. These adhesives may be applied either in solvent systems or as aqueous emulsions, depending upon the particular resin forming the base thereof.

In order to facilitate handling and shipping, a readily releasable backing or sheet material may be applied over the surface of the adhesive such as the coated paper-type referred to in the industry as "release paper." Other forms of sheet material, including synthetic plastic films, may be employed as the backing, so long as the material exhibits a sufficiently low degree of adhesion to allow stripping without removal of the adhesive coating from the composite structure.

Although the cube-corner formations in the illustrated embodiment have a uniform orientation within the array, it is possible to employ a pattern in which certain of the cube-corner formations are disposed in such a manner that their faces are not parallel to any of the faces of the adjacent cube-corner formations. Moreover, certain of the cube-corner formations may be disposed with their apices aligned other than vertically over the center of their respective bases. By thus tipping some of the cube-corner formations, retroreflectivity over a broader angle is provided for certain applications, while max-reflectivity is diminished. This is desirable for certain applications; for example, highway signs desirably may exhibit retroreflection over a broader angle relative to the surface of the sign and some light scattering desirably may be provided although the light rays falling thereon may be essentially perpendicular to its face.

By use of a sheet material of a relatively flexible resin, the composite structure may be readily shaped to various support surfaces, such as the corners of buildings, the contour of hand rails, etc. Moreover, since the composite structure may be very thin and highly flexible, it may be readily applied to fabrics used as garments, or it may itself be used in such a manner, thus affording a great deal of night-time visibility to the wearer. Exemplary uses for safety applications are tabs and stripes on jackets and rainwear, tags that may be worn at various points upon the body, reflective patches for hats, reflective welting for the production of various garments, etc.

Illustrative of the efficacy of the present invention is the following specific example, wherein all parts and percentges are on a weight basis, unless otherwise specified, and wherein reference is made to the appended drawings.

Example 1

An engraved master plate is formed from aluminum using a cutting tool to generate a pattern or array of cube-corner formations, substantially as illustrated in FIGS. 8 and 9. Electroforms of nickel are prepared from the master plate and thereafter assembled into a larger mold member. A number of such mold members are then arranged about the circumference of a drum, such as 10 to develop the mold surface portion 14 thereon. As shown the cube-corner recesses 22 are closely spaced and substantially free of smooth areas therebetween; they have a depth of 0.0235 inch and a side edge dimension of 0.0056 inch.

Figure 6:
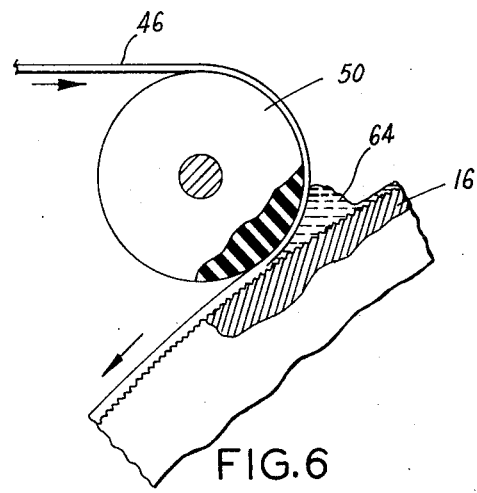
FIG. 6 is a fragmentary view in partial section to an enlarged scale of the apparatus of FIG. 1 at the film applying location which partially diagrammatically illustrates the liquid distributing action occurring at the nip between the molding drum and the relatively resilient pressure roller.

Onto the mold surface there is first applied from spray head 28 dioctyl phthalate 62 to coat the surfaces of the recesses. There is then deposited from head 26 a polyvinyl chloride plastisol formulation 64 containing monomeric plasticizers and 10.0 percent of a cross-linkable acrylic formulation. Polyvinyl chloride film 46, about 0.012 inch thick, is removed from the supply roll 42 and applied against the mold surface and resin formulation 64 under pressure created by the roll 50. In passing together through the nip formed between drum 10 and roll 50, intimate contact is effected between the film 46 and resin formulation 64, and the latter is distributed uniformly over the mold surface as the film 46 is urged into contact therewith. The resin formulation 64 fills the recesses 22 completely and any excess material is built up as a reservoir at the nip area, as is seen in FIG. 6 The resin/film combination then passes adjacent radiant heaters 40 which raise the temperature of the resin formulation to about 350° Fahrenheit to flux the formulation and cross-link the acrylic resin component. The drum 10 rotates at a rate of about ⅙ so that exposure to heat lasts about three minutes, after which the assembly is conveyed through the water filled trough 36 to effect rapid cooling thereof. Inspection of the sheeting 54 produced is accomplished with the optical scanner 58 as the composite passes to the reel 44, as previously described.

Examination under a microscope indicates that the surface of the sheeting has minute cube-corner formations bonded thereto in a contiguous array, as illustrated in FIGS. 8 and 9 of the attached drawings. The composite sheeting is highly flexible and can be readily utilized for fabric applications. Upon testing with a controlled light source, it is found to be highly retroreflective within a narrow cone over angles of incidence to the front surface of up to 45°. This material is found to be highly retroreflective and attractive when tested in the form of hang tags, welting, flags, etc.

Thus, it can be seen that the present invention provides a novel method of continuously producing retroreflective sheeting of substantially uniform dimension, wherein a multiplicity of substantially perfectly formed minute cube-corner formations provide a high level of retroreflectivity, and wherein undesired light refraction is minimized.

In accordance with the method, sheeting having the foregoing characteristics may be produced relatively inexpensively and with a high degree of facility and speed, and apparatus is provided for producing high quality and uniform retroreflective sheeting in which imperfections are minimized. In a specific embodiment, a rotatably mounted drum supports the mold surface, and enables the production of substantially finished composite structure in but a single revolution thereof.

Having thus described the invention, I claim:

1. In a method for making retroreflective composite sheeting on a continuous basis, the steps comprising:
    (A) depositing a hardenable molding material upon a a moving mold surface having an array of minute, contiguous cube-corner recesses therein, each of said recesses having a maximum side edge dimension of less than about 0.025 inch, said molding material being a transparent, fluid synthetic resin formulation sufficient in amount to completely fill said recesses;
    (B) applying a flexible film-like sheet material of transparent synthetic resin to said molding material on said mold surface under sufficient pressure to effect intimate surface contact therebetween;
    (C) subjecting said molding material to conditions sufficient to effect substantial solidification thereof and bonding thereof to the adjacent surface of said sheet material to form a composite structure therewith; and
    (D) removing said composite structure from said mold surface to provide retroreflective sheeting comprising a body portion provided by said preformed sheet material which presents a substantially smooth front surface, and a multiplicity of minute cube-corner formations corresponding to said recesses and closely spaced about and projecting from the opposite surface of said body portion, said close spacing substantially avoiding any smooth areas between said cube-corner formations, so that the light rays entering said sheeting through the front surface of said body portion predominately pass through and into said cube-corner formations, by which they are reflected back through the body portion along a path substantially parallel to the path of entry.

2. The method of claim 1 including the additional step of uniformly distributing the hardenable molding material over said molding surface, said distributing step being effected simultaneously with said sheet material-applying step by introducing said molding material and sheet material in the appropriate superposed relationship into a nip of substantially fixed spacing formed between said molding surface and an adjacent member cooperating therewith.

3. The method of claim 1 wherein said molding material is a molten synthetic resin and the solidification thereof is accomplished at least in part by cooling, the inherent nature of said molten resin producing bonding thereof to said sheet material.

4. The method of claim 1 wherein said molding material is a resin having cross-linkable groups, and wherein said solidification thereof is accomplished at least in part by cross-linking of said resin.

5. The method of claim 1 wherein said molding material is a partially polymerized resin formulation, and wherein said solidification thereof is accomplished at least in part by effecting further polymerization in said formulation.

6. The method of claim 1 wherein said molding materials is selected from the group consisting of vinyl halide resins, (alk) acrylic ester resins, ethylenically unsaturated nitrile resins, monovinylidene aromatic hydrocarbon resins, olefin resins, cellulose ester resins, polysulfone resins, polyphenylene oxide resins and polycarbonates.

7. The method of claim 1 wherein said synthetic resin of said sheet material is selected from the class consisting of polyvinyl halides, polyethylene terephthalate, polyvinylidene chloride, polycarbonates, polyfulfones and cellulose ester polymers.

8. The method of claim 1 additionally including the step of applying a wetting agent for said molding material to said molding surface before depositing said molding material thereon, to improve flow of said molding material into said recesses thereof.

9. The method of claim 1 additionally including the step of depositing a reflective coating on the faces of said cube-corner formations after removal of said composite structure from said mold surface.

10. The method of claim 9 additionally including the steps of depositing an adhesive layer on said reflective coating, and removably adhering backing material to said adhesive layer, said backing material being removable to adhere said retroreflective sheeting to a substrate.

11. The method of claim 1 wherein said maximum side edge dimension of said recesses is 0.01 inch.

12. The method of claim 1 wherein said conditions of step C comprise actinic radiation.

13. The method of claim 12 wherein said radiation comprises heat, and wherein said conditions also include subsequent cooling of said molding material.

14. The method of claim 12 wherein said radiation is selected from the group consisting of high energy electromagnetic radiation and high energy charged particles.

References Cited

UNITED STATES PATENTS

| | | | |
|---|---|---|---|
| 2,361,082 | 10/1944 | Brown | 117—10 X |
| 3,533,872 | 10/1970 | Robbins et al. | 156—245 |
| 2,248,638 | 7/1941 | Merton | 264—1 X |
| 3,278,322 | 10/1966 | Harkins et al. | 117—10 |

RALPH S. KENDALL, Primary Examiner

C. WESTON, Assistant Examiner

U.S. Cl. X.R.

156—242, 243, 500, 553; 264—166, 212; 350—292